United States Patent
Cheriet et al.

(10) Patent No.: US 7,035,744 B2
(45) Date of Patent: Apr. 25, 2006

(54) METHOD AND SYSTEM FOR MEASURING THE ENERGY OF A SIGNAL

(75) Inventors: Mohamed Cheriet, Montreal (CA); Adei Belouchrani, Alger (DZ)

(73) Assignee: Socovar, s.e.c., Montreal (CA)

( * ) Notice: Subject to any disclaimer, the term of this patent is extended or adjusted under 35 U.S.C. 154(b) by 0 days.

(21) Appl. No.: 10/476,727

(22) PCT Filed: May 2, 2002

(86) PCT No.: PCT/CA02/00658

§ 371 (c)(1),
(2), (4) Date: Apr. 29, 2004

(87) PCT Pub. No.: WO02/088760

PCT Pub. Date: Nov. 7, 2002

(65) Prior Publication Data

US 2004/0204880 A1 Oct. 14, 2004

(30) Foreign Application Priority Data

May 2, 2001 (CA) .................................... 2346160

(51) Int. Cl.
*G01R 23/16* (2006.01)

(52) U.S. Cl. .......................................... 702/77; 73/602

(58) Field of Classification Search .................. 702/60, 702/66, 69, 70, 71, 73–77, 106, 109, 124, 702/126, 189, 198; 375/142, 147; 600/443, 600/447; 708/5, 315, 420, 426, 813
See application file for complete search history.

(56) References Cited

U.S. PATENT DOCUMENTS 5,417,114 A * 5/1995 Wadaka et al. ................ 73/602

OTHER PUBLICATIONS

Remaki et al: "KCS-New Kernel Family with Compact Support in Scale Space: Formulation and Impact", IEEE Transactions on Image Processing IEEE Inc., New York, US, vol. 9, No. 6, Jun. 2000, pp. 970-981, XP000951901—ISSN: 1057-7149.

Belouchrani A et al: "On the Use of a New Compact Support Kernel in Time Frequency Analysis, ", Proceedings of the 11th IEEE Signal Processong Workshop in Statistical Signal Processing, (Cat. No. 01TH8563), Proceedings PF SSP2001. 11th IEEE Workshop on Statistical Signal Processing, Singapore, Aug. 6-8, 2001, pp. 333-336, XP002225291, 2001, Piscatawat, NJ, USA, IEEE, USA—ISBN: 0-7803-7011-2.

(Continued)

*Primary Examiner*—Marc S. Hoff
*Assistant Examiner*—Mohamed Charioui
(74) *Attorney, Agent, or Firm*—Quarles & Brady LLP

(57) ABSTRACT

A method and system for measuring the energy of a signal in which samples of the signal are generated, analytical signals are produced from said samples of the signal, a convolution of an instantaneous autocorrelation function is computed from said analytical signals, and from a CB kernel derived from a Gaussian kernel and having compact support properties, and a time-frequency distribution of the energy of the signal from is determined from said instantaneous autocorrelation function.

15 Claims, 23 Drawing Sheets

OTHER PUBLICATIONS

Jinhai Cai et al: "Robust Pitch Detection of Speech Signals Using Steerable Filters", Acoustics, Speech and Signal Processing, 1997, ICASSP-97, 1997 IEEE International Conference on Munich, Germany Apr. 21-24, 1997, Los Alamitos, CA, USA, IEEE Comput. Soc, US, Apr. 21, 1997, pp. 1427-1430, XP010226072, ISBN: 0-8186-7919-0.

* cited by examiner

METHOD AND SYSTEM FOR MEASURING THE ENERGY OF A SIGNAL

FIELD OF THE INVENTION

The present invention relates to non-stationary signal analysis. More specifically, the present invention is concerned with time-frequency analysis of the energy of non-stationary signals.

BACKGROUND OF THE INVENTION

Time-frequency distributions are widely used more and more for non-stationary signal analysis. They perform a mapping of one-dimensional signal x(t) into a two dimensional function of time and frequency $TFD_x(t,f)$ that yields a signature of the variation of the spectral content of the signal with time.

Many approaches are known in the art to perform the above-mentioned mapping. The most intuitive approach consists of analyzing the signal for small periods of time during which it can be assumed that the signal does not contain rapid changes. In the context of a slowly varying signal, this window concept will provide a useful indication of the variations over time.

The well-known spectrogram and the short-time Fourier transform are techniques that utilize the above window concept, and have become standard techniques in the art. These known systems, however, are not useful in situations where the energy, or spectral content of the signal, varies with such rapidity that the signal cannot reasonably be considered to be stationary for almost any window duration. In this regard, it is to be noted that, as the duration of the window is decreased, the frequency resolution of the system is also decreased.

As indicated, the spectrogram applies the Fourier transform for a short-time analysis window, within which it is assumed that the signal behaves reasonably within the requirements of stationarity. Moving the analysis window in time along the signal, one hopes to track the variations of the signal spectrum as a function of time. If the analysis window is made short enough to capture rapid changes in the signal, it becomes impossible to resolve frequency components that are close in frequency during the analysis window duration.

The well-known Wigner-Ville distribution provides a high-resolution representation in time and in frequency for a non-stationary signal, such as a chirp. However, it suffers from significant disadvantages. For example, its energy distribution is not non-negative and it is often characterized with severe cross terms, or interference terms, between components in different time-frequency regions. These cross terms lead to false manifestation of energy in the time frequency plan.

The Choi-Williams distribution allows reduction of such interferences compared to the Wigner-Ville distribution.

Since the spectrogram, Short-Time Fourier transform, Wigner-Ville and Choi-Williams distributions are believed to be well known in the art, they will not be described herein in further detail.

A general class of time-frequency distributions (TFD) is the Cohen's class distributions. A member of this class has the following expression:.

$$TFD_x(t,f) = \tag{1}$$

$$\int\int\int \phi(\eta, \tau) \times \left(t' + \frac{\tau}{2}\right) x^H \left(t' - \frac{\tau}{2}\right) e^{-j2\pi\eta t} e^{-j2\pi\tau f} e^{-j2\pi\eta t'} dt' d\tau d\eta$$

where t and f represent time and frequency, respectively, and $^H$ the transposed conjugate operator.

The kernel $\phi(\eta,t)$ characterizes the resulting TFD. It is known in the art that the use of a Cohen's class of distributions allows the definition of kernels whose main property is to reduce the interference patterns induced by the distribution itself.

An example of such a kernel is the Gaussian kernel that has been described in "*KCS—New Kernel Family with Compact Support in Scale Space: Formulation and Impact*", from *IEEE T-PAMI*, 9(6), pp. 970–982, June 2000 by I. Remaki and M. Cheriet.

A problem with the Gaussian kernel is that it does not have the compact support analytical property, i.e. it does not vanish itself outside a given compact set. Hence, it does not recover the information loss that occurs due to truncating. Moreover, the prohibitive processing time, due to the mask's width, is increased to minimize the loss of accuracy.

SUMMARY OF THE INVENTION

More specifically, in accordance with the present invention, there is provided a method for measuring the energy of a signal comprising:

providing a number N of samples n of the signal;

processing each of the N samples of the signal through a Hillibert transform so as to yield N corresponding analytical signals;

for values of n ranging from 1 to N, providing a window of analysis of length M;

for values of m ranging from 1 to M, computing an instantaneous autocorrelation function corresponding to each of the values of m; and computing the convolution of a CB kernel and the corresponding instantaneous autocorrelation function, yielding a generalized instantaneous autocorrelation function for each combination of the values of m and n; the CB kernel being defined by $$K(n,m) = \begin{cases} \exp\left(C\left(\frac{1}{(n^2+m^2)\left(\frac{B}{M}\right)^2 - 1} + 1\right)\right) & \text{if } (n^2+m^2)\left(\frac{B}{M}\right)^2 < 1 \\ 0 & \text{Otherwise} \end{cases}$$

where B and C are predetermined parameters; and applying a Fast Fourier Transform to the generalized instantaneous autocorrelation functions, yielding information about the energy of the signal for each of the N samples.

According to a second aspect of the present invention there is provided a system for measuring the energy of a signal, comprising:

an acquisition unit for providing samples of the signal;

a Hilbert transformer for producing analytical signals from the samples of the signal;

a local correlator for computing the convolutions of a CB kernel and instantaneous autocorrelation functions in a window of analysis of length M so as to yield generalized instantaneous autocorrelation functions; the CB kernel being defined by $$K(n,m) = \begin{cases} \exp\left(C\left(\frac{1}{(n^2+m^2)\left(\frac{B}{M}\right)^2-1}+1\right)\right) & \text{if } (n^2+m^2)\left(\frac{B}{M}\right)^2 < 1 \\ 0 & \text{Otherwise} \end{cases}$$

where B and C are predetermined parameters; and a Fourier transformer for determining information related to the energy of the signal from the generalized instantaneous autocorrelation functions.

Other objects, advantages and features of the present invention will become more apparent upon reading the following non-restrictive description of preferred embodiments thereof, given by way of example only with reference to the accompanying drawings.

DESCRIPTION OF THE PREFERRED EMBODIMENT

According to the present invention, a method and system are provided for measuring the energy of a signal using a time-frequency distribution based on a new kernel derived from the Gaussian kernel. This new Kernel will be referred to herein as the Cheriet-Belouchrani (CB) kernel. Unlike the Gaussian kernel, the CB kernel has the compact support analytical property. Hence, it recovers the information loss that occurs for the Gaussian kernel due to truncation and improves the processing time.

Figure 1:
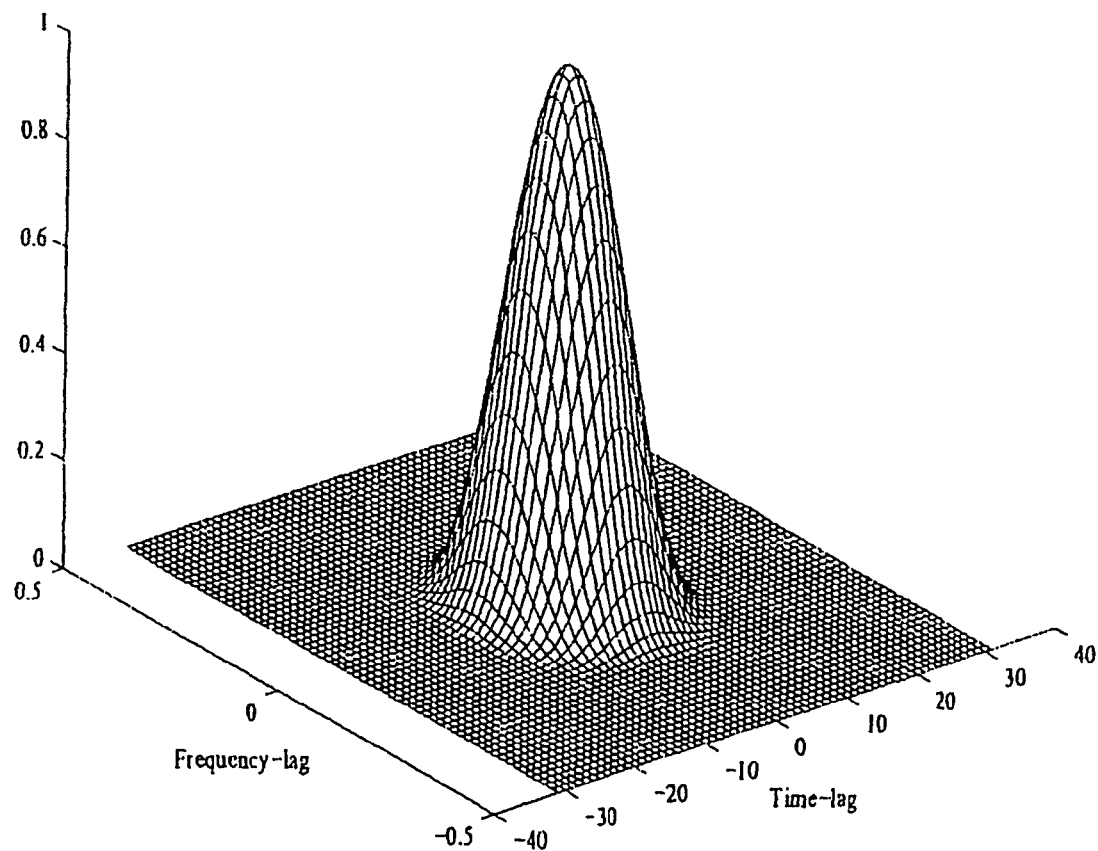
FIG. 1 is a graph illustrating a kernel used with a method for measuring the energy of a signal according to an embodiment of the present invention.

The CB kernel is derived from the Gaussian kernel by transforming the $IR^2$ space into a unit ball through a change of variables. This transformation packs all the information into the unit ball. With the new variables, the Gaussian is defined on the unit ball and vanishes on the unit sphere. Then, it is extended over all the $IR^2$ space by taking zero values outside the unit ball. The obtained kernel still belongs to the space of functions with derivatives of any order. The CB kernel, also referred to as KCS (Kernel of Compact Support) is described in "*KCS—New Kernel Family with Compact Support in Scale Space: Formulation and Impact*", from *IEEE T-PAMI*, 9(6), pp. 970–982, June 2000 by I. Remaki and M. Cheriet and has the following expression:

$$\phi(\eta, \tau) = \begin{cases} e^{\frac{1}{2}\left(\frac{\gamma}{\eta^2+\tau^2-1}+\gamma\right)} & \eta^2+\tau^2 < 1 \\ 0 & \text{elsewhere} \end{cases}$$

where $\gamma$ is a parameter that controls the kernel width. FIG. 1 shows the KCS with $\gamma=5.5$.

One of the advantages of a method and system for measuring the energy of a signal, using a time-frequency distribution based on the CB kernel, is that it recovers the above information loss and improves processing time and thus retaining the most important properties of the Gaussian kernel. These features are achieved due to the compact support analytical property of the CB kernel. This compact support property means that the kernel vanishes outside a given compact set.

Figure 2:
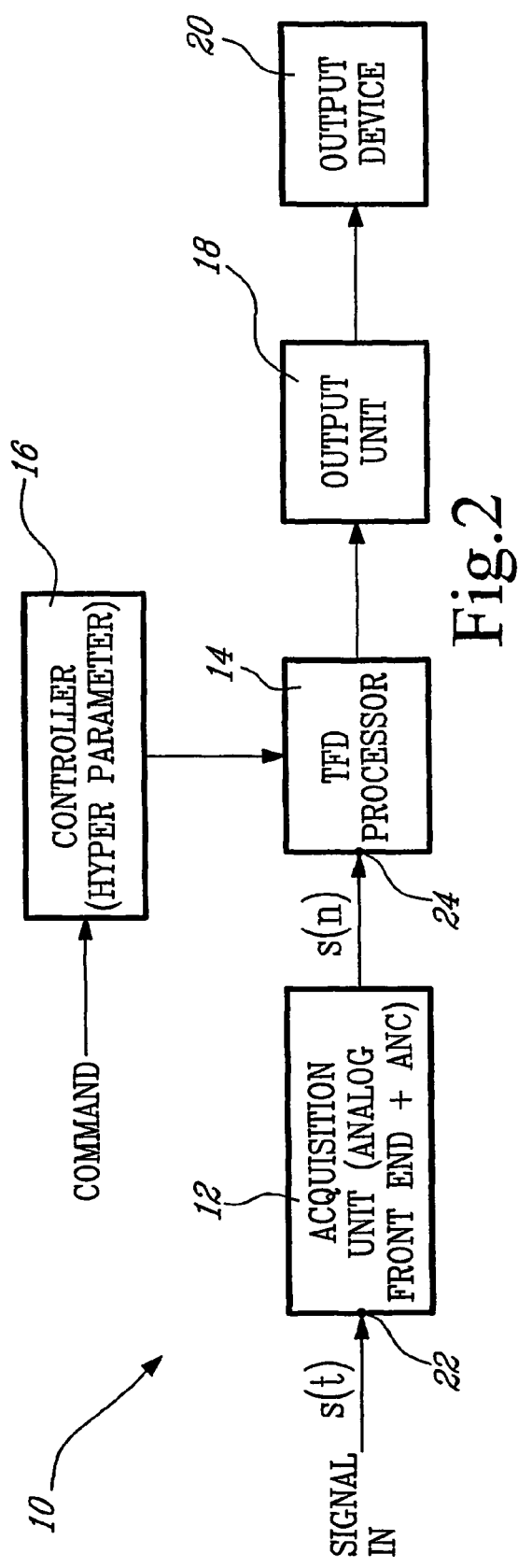
FIG. 2 is a bloc diagram of an electroencephalogram time frequency (EEG TF) analyser, incorporating a system for determining the energy of a signal according to an embodiment of the present invention.

Turning now to FIG. 2, an electroencephalogram time frequency (EEG TF) analyser, incorporating a system for determining the energy of a signal according to an embodiment of the present invention is illustrated.

The EEG TF analyser 10 comprises a signal acquisition unit 12, a system for determining the energy of a signal according to an embodiment of the present invention in the form of a time frequency distribution (TFD) processor 14, a parameter controller 16, an output unit 18, and an output device 20.

The signal acquisition unit 12 includes conventional input ports to receive signals from an EEG (not shown). The signal acquisition unit 12 is configured to receive signals having a frequency ranging from 0 Hz to about 40 Hz. The unit 12 includes an analog front end, and an analog/digital converter (sampler) to convert an analog signal s(t) at input 22 into a series of digital samples s(n) at its output 24. Since signal acquisition units and analog/digital converter are believed to be well known in the art, they will not be described herein in more detail.

The parameter controller 16 includes a user input interface allowing to specify different operating parameter of the TFD processor 14 as will be explained hereinbelow in more detail. The parameter controller 16 may take many forms, from a console display panel equipped with input knobs, to a user interface programmed into a computer (not shown).

The output unit 18 and output device 20 are advantageously in form of a visualization unit and of a display monitor respectively. The output unit is configured to receive signals from the TFD processor 14, and to process the received signals so as to be displayed onto the output device 20. The output unit may be provided with a user interface or alternatively be controlled by the controller 16 or by another controller (not shown).

The EEG TF analyser 10 may include a storing means (not shown) for storing input signals and/or outputs from the output unit 18. The storing means may take many forms, including an EEPROM (Electrically Erasable Programmable Read-Only Memory), ROM (Read-Only Memory), a Hard-disk, a disk, DVD or CD-ROM drive, etc. Optionally, the EEG TF analyser 10 may be connected to a computer network, such as Internet.

The TFD processor 14 and the output unit 18 may also be embodied in many ways, including hardware or software. For example, they can be in the form of Field-Programmable Gate Arrays (FPGA) advantageously programmed using a very-high level description language (VHDL).

The EEG TF analyser 10, when in the form of a computer system, includes appropriate software that enabled a method for determining the energy of a signal according to an embodiment of the present invention.

Figure 3:
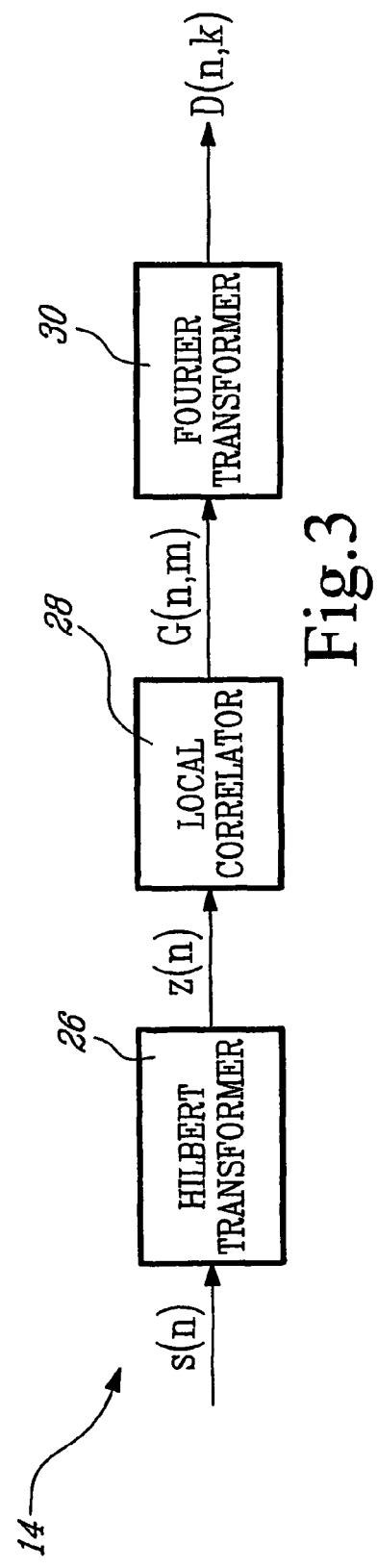
FIG. 3 is a bloc diagram of the TFD processor. from FIG. 2.

Turning now to FIG. 3, the TFD processor 14 is illustrated. The TFD processor 14 includes a Hilbert transformer 26 to produce analytic signal, a local correlator 28 for producing a plurality of signals corresponding to the samples delayed and multiplicatively combined with their complex conjugates, and a Fourier transformer 30 for producing a distribution as a function of time and frequency. The local correlator 28 advantageously includes a bank of delay and adder for correlating the outputs of the multipliers in accordance with the CB-kernel as will be explained hereinbelow.

Figure 4:
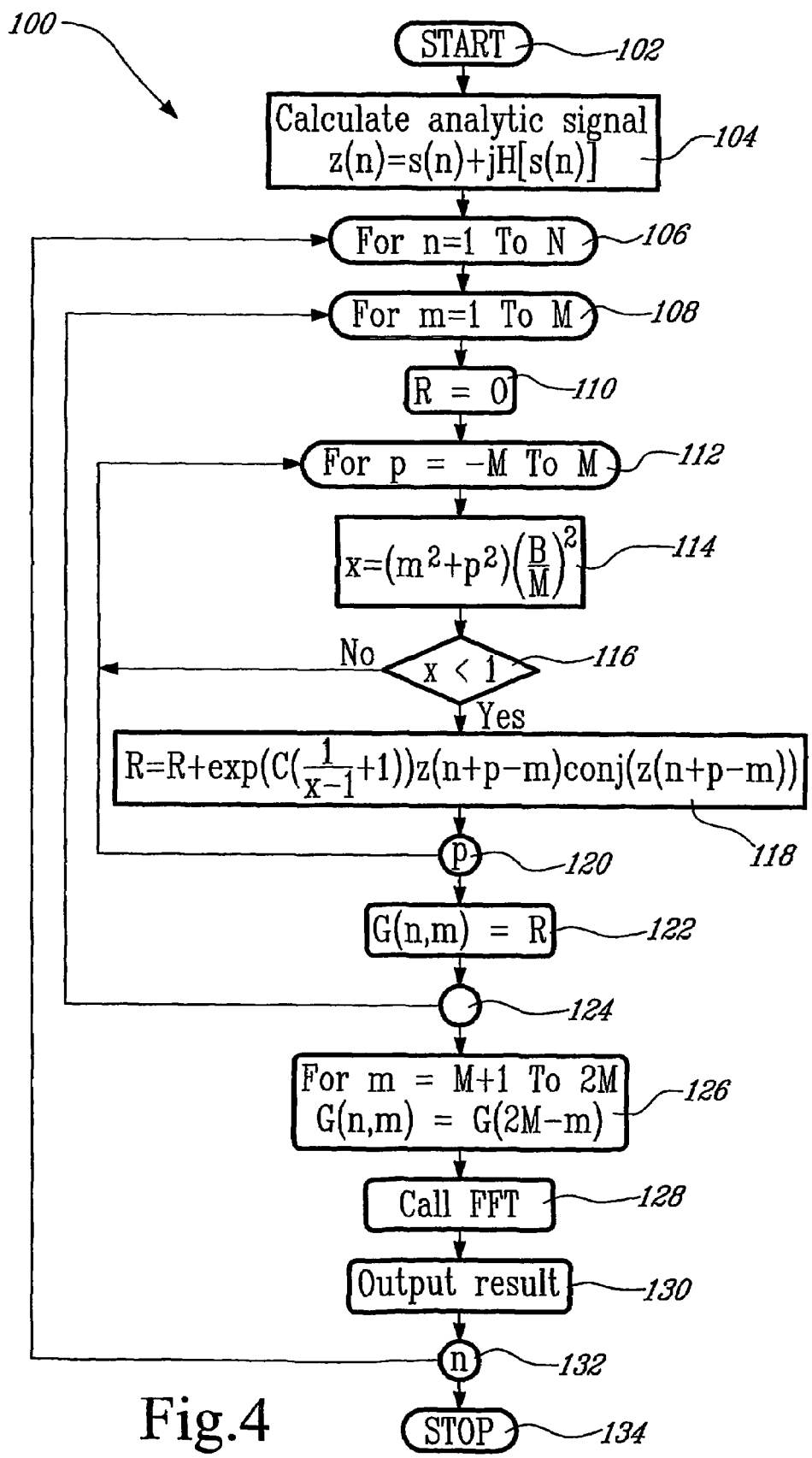
FIG. 4 is a flowchart of a method for determining the energy of a signal according to an embodiment of the present invention.

The function of each of the components of the TFD processor 14 will become more apparent upon reading the following description of a method 100 for determining the energy of a signal according to an embodiment of the present invention, with reference to FIGS. 2 to 4.

It is to be noted that the method 100 allows implementing the following equations from the CB-distribution:

$$D(n, k) = \underset{m \to k}{FFT}(K(n, m)_n^* A(n, m))$$

where $A(n,m) = z(n+m)z^*(n-m)$ is the instantaneous autocorrelation, $$\underset{m \to k}{FFT}(.)$$

is the Fast Fourier Transform performed over the time-lag m, $_n*$ is the discrete time convolution operator over n and $K(n,m)$ is the CB kernel defined as:

$$K(n, m) = \begin{cases} \exp\left(C\left(\dfrac{1}{(n^2+m^2)\left(\dfrac{B}{M}\right)^2-1}+1\right)\right) & \text{if } (n^2+m^2)\left(\dfrac{B}{M}\right)^2 < 1 \\ 0 & \text{Otherwise} \end{cases}$$

where B and C two parameters that controls the resolution and the cross term rejection, M is the length of the analysis window.

The generalized instantaneous autocorrelation is the convolution of the kernel and the instantaneous autocorrelation, which is defined by:

$$G(n,m) = K(n,m)_n * A(n,m)$$

The CB-distribution can be also expressed as:

$$D(n, k) = \sum_{m=-M}^{M} \sum_{p=-M}^{M} K(p-n, m) z(p-m) z^*(p-m) \exp\left(-j4\pi \frac{mK}{N}\right)$$

At 102, the method start by the TFD processor 14 receiving a digital sample s(n). At 104, the real signal s(n) is transformed to an analytical signal by an Hilbert transform. The Hilbert transformer 26 of the TFD processor 14 performs step 104. The signal s(n) may be kept real if desired.

At step 106, a loop begins that proceeds from step 108 to step 130 for all N samples created by the acquisition unit 12.

At step 108, a nested loop, including steps 110–122, begins over time-lags that calculates half of the generalized instantaneous autocorrelation function G(n,m). Values of m range from 1 to M, M being the length of the chosen window of analysis). It is to be noted that the other half is obtained by symmetry and is processed at step 126.

At step 110, the initial value of the generalized instantaneous autocorrelation function is set to zero at each lag beginning.

Steps 112 to 120 represent a nested loop that correspond to the computation of the convolution of the CB kernel and the instantaneous autocorrelation function to produce at step 122 the generalized instantaneous autocorrelation function.

More specifically, the argument x of the CB kernel is first computed in step 114. This argument includes the parameter B, which controls the cross term rejection and the resolution of time-frequency representation. The parameter B is inputted and adjusted via the parameter controller 16 on FIG. 2.

The next step (116) allows testing the argument x: If $x \geq 1$, then the convolution sum R is not updated (step 118), otherwise, R is updated at step 118. The instantaneous autocorrelation is computed in step 118, by the local correlator 28, by producing a plurality of autocorrelated signals corresponding to the samples delayed and multiplicatively combined with their complex conjugates and weighted in accordance with the CB-kernel. It is to be noted that the CB-kernel (step 118) contains a second parameter C that also has an influence on the cross term rejection and resolution and is also inputted and adjusted via the parameter controller 16 (see FIG. 2). Hence, a method for determining the energy of a signal according to the present invention provides, through parameters B and C, two degrees of freedom for the controls of the quality of the time frequency representation in terms of the resolution and cross term rejection.

The loop started at step 112 ends at step 120. The loop started at step 108 in turn ends at step 124.

As explained hereinabove, the second half of the generalized instantaneous autocorrelation function is performed at step 126.

A Fast Fourier Transform (FFT) is then applied to the generalized instantaneous autocorrelation function (step 128). The result of the process for the current sample may be displayed or plotted at function block 130 via the output unit 18 and output device 20.

The method 100 then loops to the next sample (step 132).

The method 100 ends when all samples have been processed (step 134).

Returning to FIG. 2, the acquisition unit 12 may be adapted for other frequency ranges than 0–40 Hz. For example, a speech time frequency analyser would have a general configuration similar to the configuration described in FIG. 2 for the EEG TF analyser, with the exception of the acquisition unit 12, which will be configured to operate in the range 0–8 kHz. The acquisition unit of a radio frequency (RF) analyser incorporating a TFD processor according to an embodiment of the present invention would have to be configured for frequencies from 300 MHZ up to 6 GHZ and more, depending on Analog Digital Converters (ADC) available.

A method and system for determining the energy of a signal according to embodiments of the present invention may be used in any application that requires information about the energy of a signal in relation with time and frequency. Such applications include spectral analyser, biomedical sensors (ultrasound devices, scanners, nuclear magnetic resonance, etc.) mechanical vibration analysis, X-ray photography, air-flow tubes, electromyography, spectrographs, mingographs, larygographs, seismic spectrograms, telecommunication, etc.

The present invention is particularly advantageous to reduce noises and interference in a signal. Indeed, random noises tend to spread equally in a time-frequency continuum, while the wanted signal is concentrated in relatively narrow region. Consequently, the signal to noise ratio is increased substantially in the time-frequency domain with methods and systems according to the present invention. The present invention allows building time varying filters.

Comparison Results

Turning now to FIGS. 5 to 28 of the appended drawings, time-frequency representations of the energy of different signals are shown. These representations are obtained using the method 100 as well as methods from the prior art, such as spectogram technique using a Backman-Harris window, Wigner Ville distribution and Choi-Williams distribution. To provide comparable results between the method 100 and methods from the prior art, results from FIGS. 5 to 28 were obtained using Matlab™. The results are shown on a linear scale.

Figure 6:
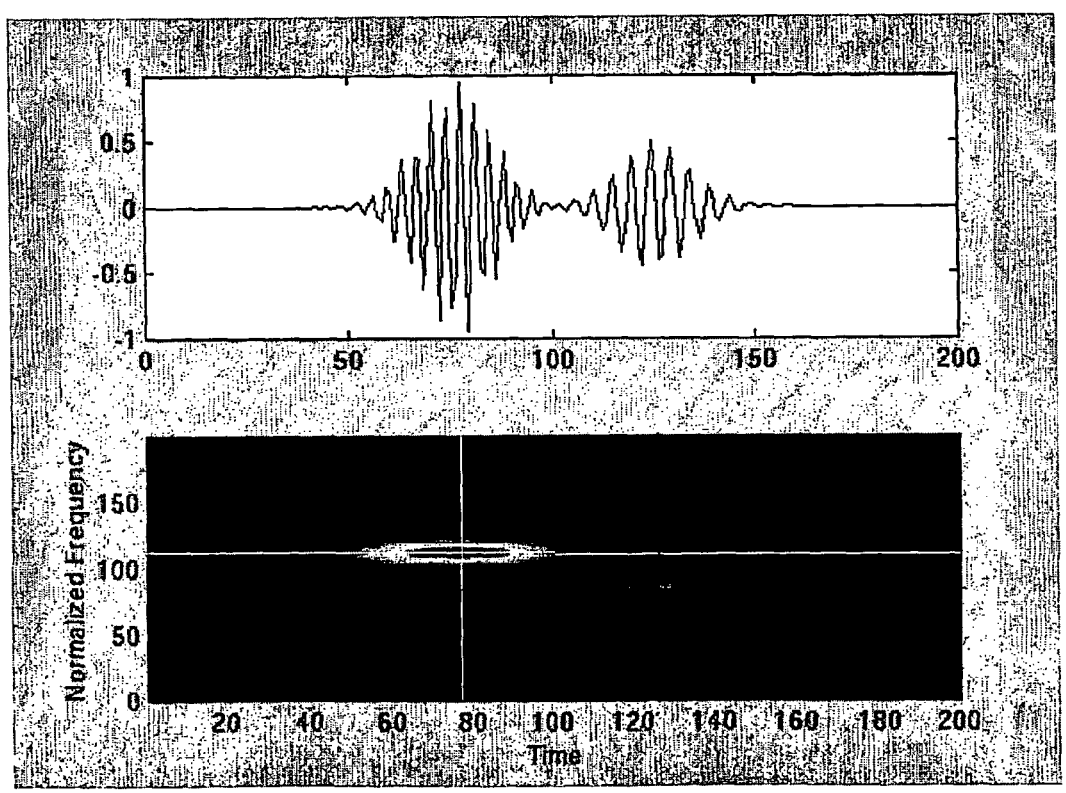
FIG. 6 is a graph illustrating the time variation and the TFD of the two wavelets of FIG. 5, as obtained using a method for determining the energy of a signal according to an embodiment of the present invention.
Figure 7:
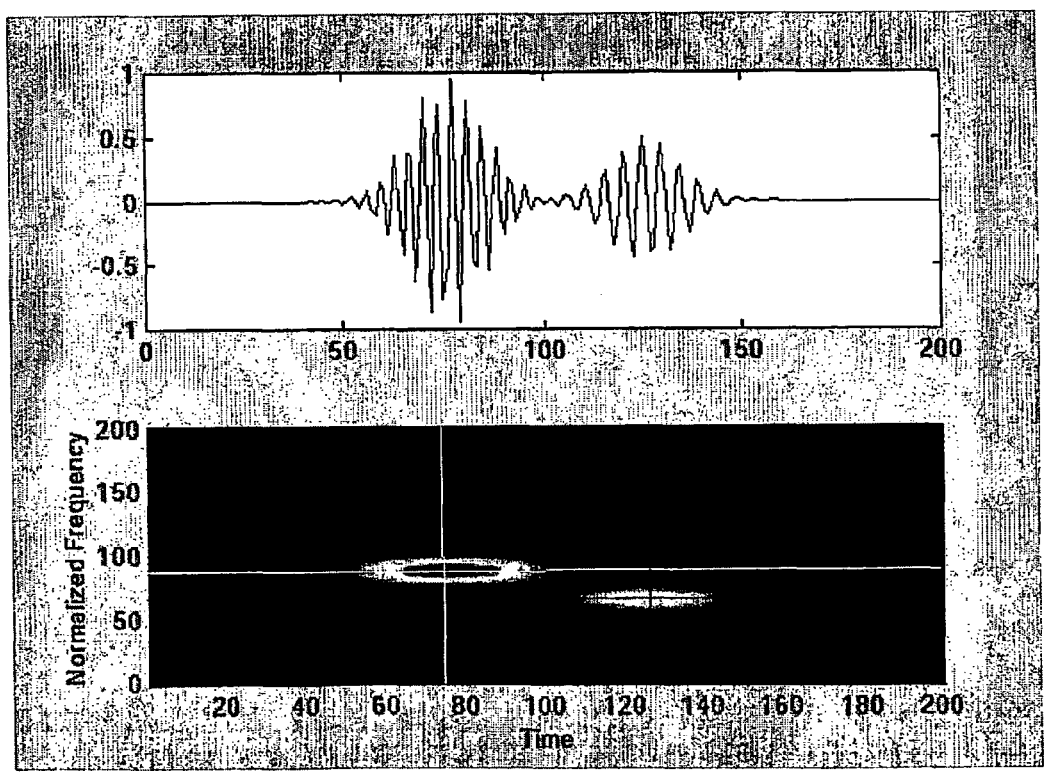
FIG. 7 is a graph illustrating the time variation and the spectrogram of the two wavelets of FIG. 5, as obtained using the spectral window of Blackman-Harris.
Figure 8:
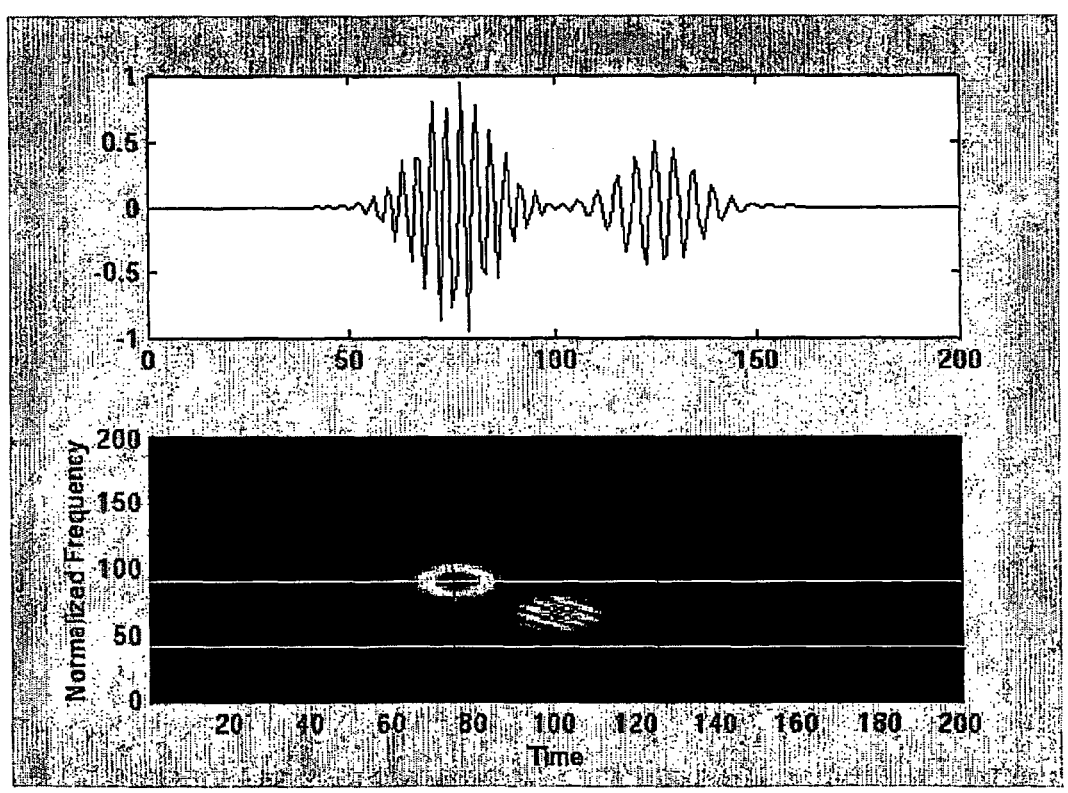
FIG. 8 is a graph illustrating the time variation and the TFD of the two wavelets of FIG. 5, as obtained using the Wigner-Ville transformation.

FIGS. 6 to 8 illustrate the time-frequency representation of two wavelets.

Figure 5:
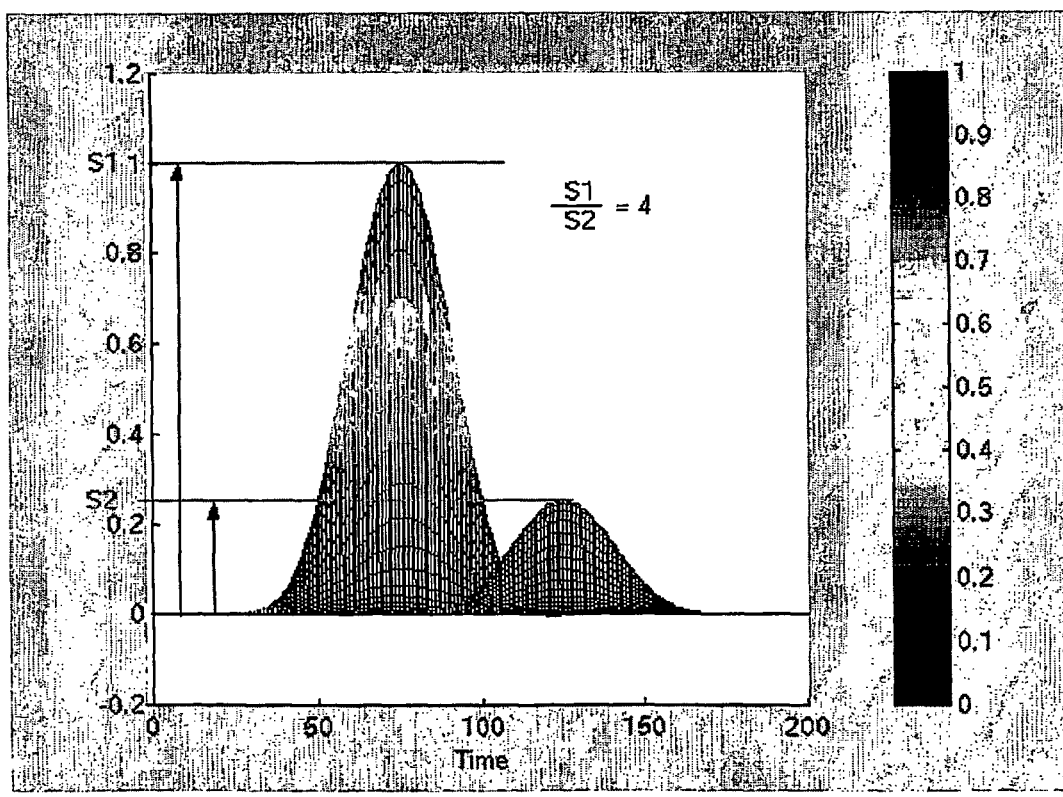
FIG. 5 is a graph illustrating the variation with time of the energy spectrum of two wavelets.

FIG. 5 illustrates the variation with time of the energy spectrum of the wavelets S1 and S2. As can be seen in FIG. 5, there is a ratio of 4 between the peaks of the two wavelets S1 and S2.

FIG. 6 illustrates the time variation (above) and the TFD (below) of the two wavelets of FIG. 5, obtained using a method according to the present invention with a resolution parameter B of 10.

As can be seen in FIG. 6, compared to methods of the prior art (FIGS. 7 and 8), a method for determining the energy of a signal according to the present invention allows an increase of the emergence of spectral peaks to smooth interference components and shows good time and frequency resolutions.

FIG. 7 illustrates the time variation (above) and the spectrogram (below) of the two wavelets of FIG. 5, as obtained using the spectral window of Blackman-Harris.

FIG. 8 illustrates the time variation (above) and the TFD (below) of the two wavelets of FIG. 5, as obtained using the Wigner-Ville transformation.

The above comparison shows that a TFD obtained from a method according to the present invention belongs to a TFD provided with a wealth of details. This can be achieved since these distributions are defined by an integral operator that acts on a quadratic form of the signal. Those classes are parametrically defined via arbitrary kernels. Properties can be advantageously imposed on the distributions by structural constraints on the corresponding kernels.

Figure 9:
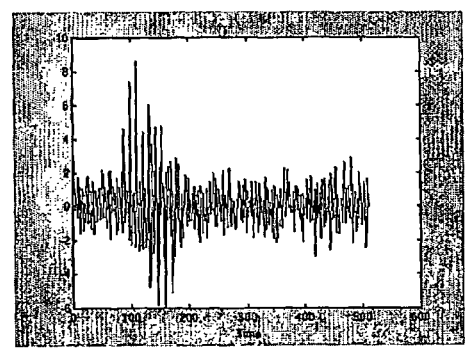
FIG. 9 is a graph illustrating the time variation of a signal centered about a frequency of about 5 GHz with additional peaks from different frequencies blended in a Gaussian white noise.

FIGS. 10 to 13 illustrate the TFD of a signal centered about a frequency of about 5 GHz with additional peaks from different frequencies blended in a Gaussian white noise (see FIG. 9).

Figure 10:
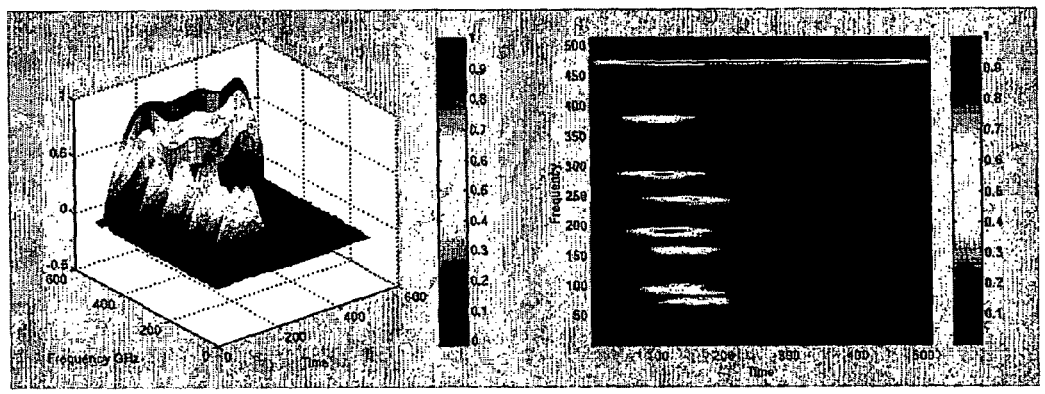
FIG. 10 is a graph illustrating a mesh and a map of the signal of FIG. 9, obtained using a method for determining the energy of a signal according to an embodiment of the present invention.

FIG. 10 illustrates a mesh (left) and a map (right) of the signal of FIG. 9, obtained using a method for determining the energy of a signal according to the present invention.

Figure 11:
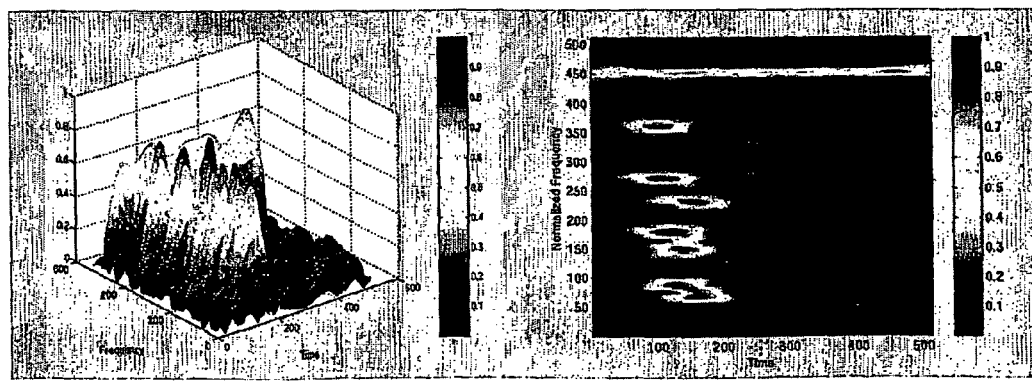
FIG. 11 is a graph illustrating a mesh and a map of the signal of FIG. 9, obtained using the spectrogram with the spectral window of Blackman-Harris.

FIG. 11 illustrates a mesh (left) and a map (right) of the signal of FIG. 9, obtained using the spectrogram with the spectral window of Blackman-Harris.

Figure 12:
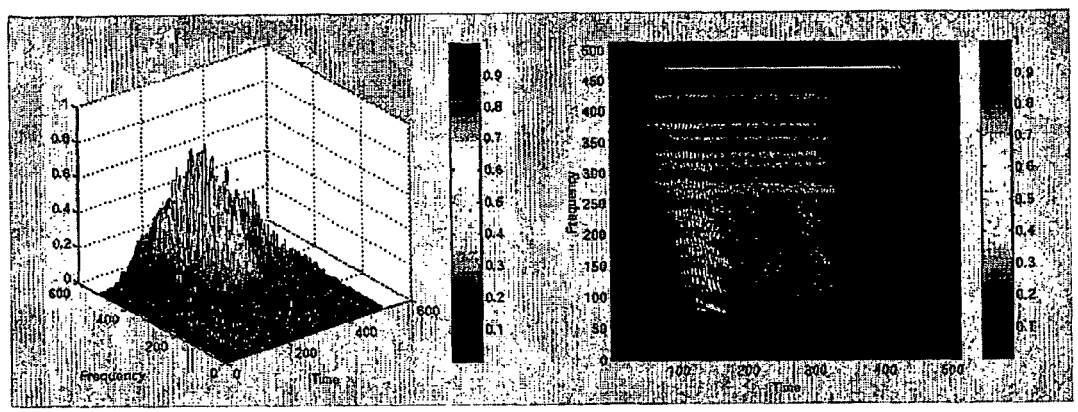
FIG. 12 is a graph illustrating a mesh and a map of the signal of FIG. 9, obtained using the Wigner-Ville transformation.

FIG. 12 illustrates a mesh (left) and a map (right) of the signal of FIG. 9, obtained using the Wigner-Ville transformation.

Figure 13:
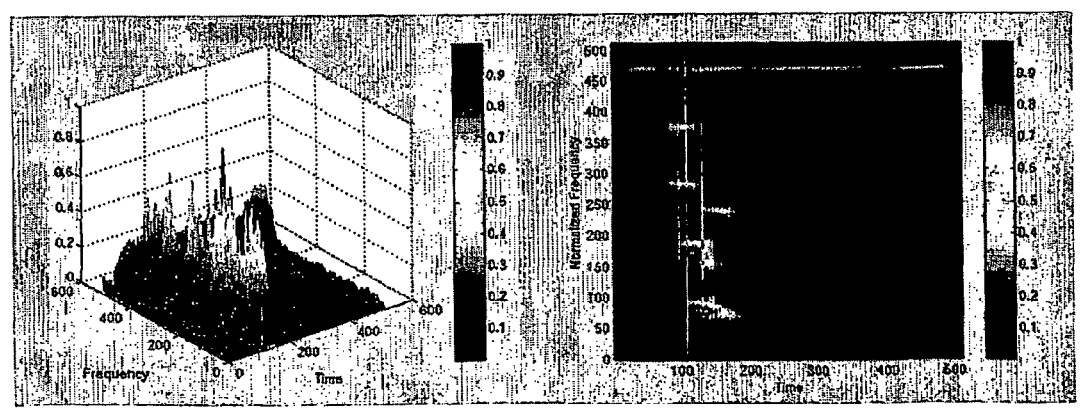
FIG. 13 is a graph illustrating a mesh and a map of the signal of FIG. 9, obtained using the Choi-Williams transformation.

FIG. 13 illustrates a mesh (left) and a map (right) of the signal of FIG. 9, obtained using the Choi-Williams transformation.

The above comparison again illustrates that a method for measuring the energy of a signal according to the present invention allows increasing of the emergence of spectral peaks, to smooth interference components and shows good time and frequency resolutions.

Figure 14:
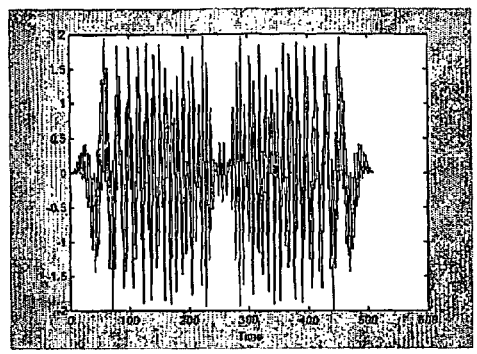
FIG. 14 is a graph illustrating two crossing chirps.

FIGS. 15 to 18 illustrate the TFD of two crossing chirps (see FIG. 14).

Figure 15:
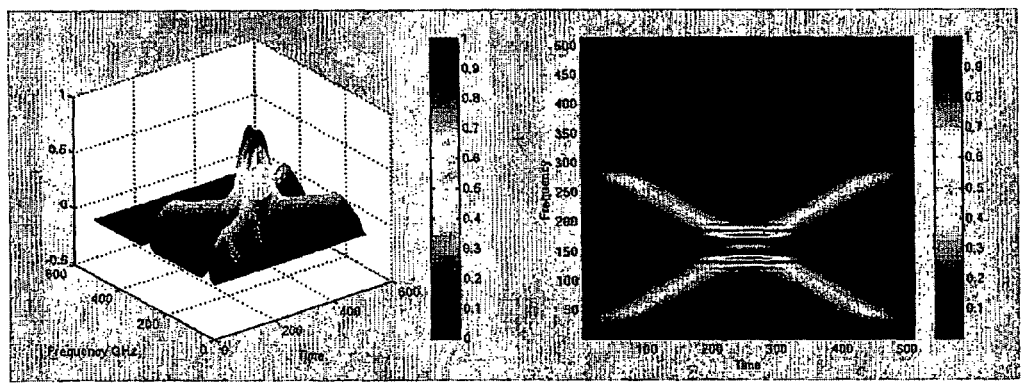
FIG. 15 is a graph illustrating a mesh and a map of the signal of FIG. 14, obtained using a method for determining the energy of a signal according to an embodiment of the present invention.

FIG. 15 illustrates a mesh (left) and a map (right) of the signal of FIG. 14, obtained using a method for determining the energy of a signal according to the present invention.

Figure 16:
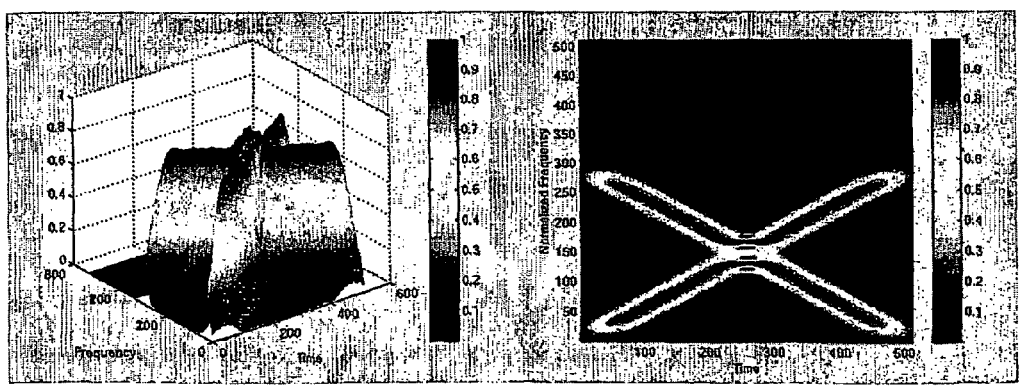
FIG. 16 is a graph illustrating a mesh and a map of the signal of FIG. 14, obtained using the spectrogram with the spectral window of Blackman-Harris.

FIG. 16 illustrates a mesh (left) and a map (right) of the signal of FIG. 14, obtained using the spectrogram with the spectral window of Blackman-Harris.

Figure 17:
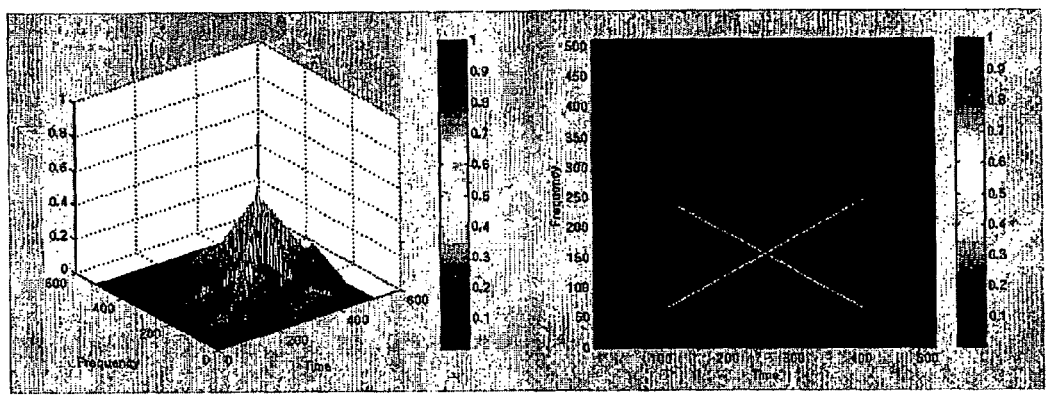
FIG. 17 is a graph illustrating a mesh and a map of the signal of FIG. 14, obtained using the Wigner-Ville transformation.

FIG. 17 illustrates a mesh (left) and a map (right) of the signal of FIG. 14, obtained using the Wigner-Ville transformation.

Figure 18:
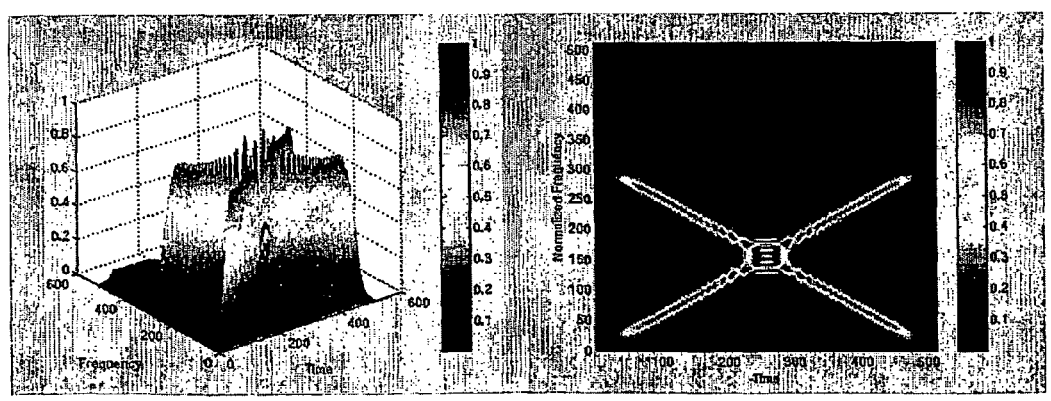
FIG. 18 is a graph illustrating a mesh and a map of the signal of FIG. 14, obtained using the Choi-Williams transformation.

FIG. 18 illustrates a mesh (left) and a map (right) of the signal of FIG. 14, obtained using the Choi-Williams transformation.

The comparisons between the results illustrated in FIGS. 15 to 18 shows that the use of the CB TFD allows removal of the cross terms and presents cute curves in contrast to the three other representations that cannot.

Figure 19:
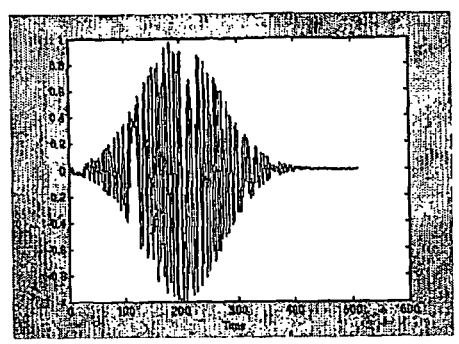
FIG. 19 is a graph illustrating a Matlab™ simulation of a high-frequency spectrum having a bandwidth of 10 MHz centered about 500 MHz.

FIGS. 20 to 23 illustrate a Matlab™ simulation of a high-frequency spectrum having a bandwidth of 10 MHz centered about 500 MHz (see FIG. 19).

Figure 20:
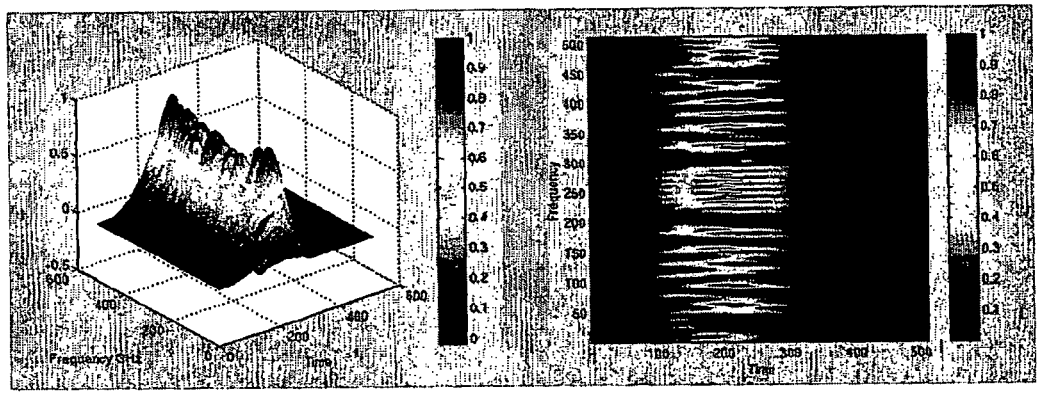
FIG. 20 is a graph illustrating a mesh and a map of the signal of FIG. 19, obtained using a method for determining the energy of a signal according to the present invention.

FIG. 20 illustrates a mesh (left) and a map (right) of the signal of FIG. 16, obtained using a method for determining the energy of a signal according to the present invention.

Figure 21:
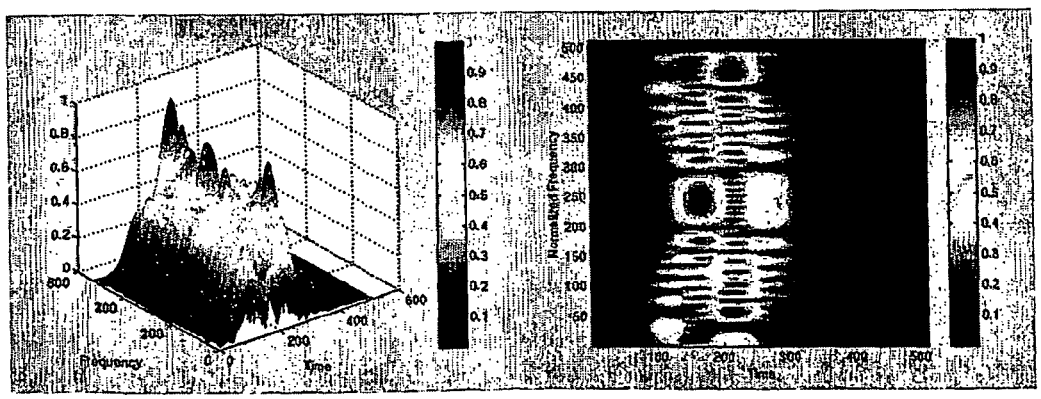
FIG. 21 is a graph illustrating a mesh and a map of the signal of FIG. 19, obtained using the spectrogram with the spectral window of Blackman-Harris.

FIG. 21 illustrates a mesh (left) and a map (right) of the signal of FIG. 19, obtained using the spectrogram with the spectral window of Blackman-Harris.

Figure 22:
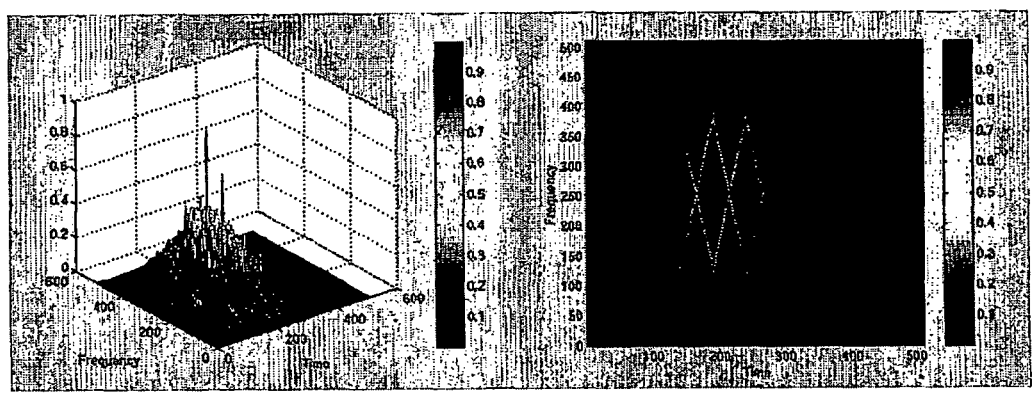
FIG. 22 is a graph illustrating a mesh and a map of the signal of FIG. 19, obtained using the Wigner-Ville transformation.

FIG. 22 illustrates a mesh (left) and a map (right) of the signal of FIG. 19, obtained using the Wigner-Ville transformation.

Figure 23:
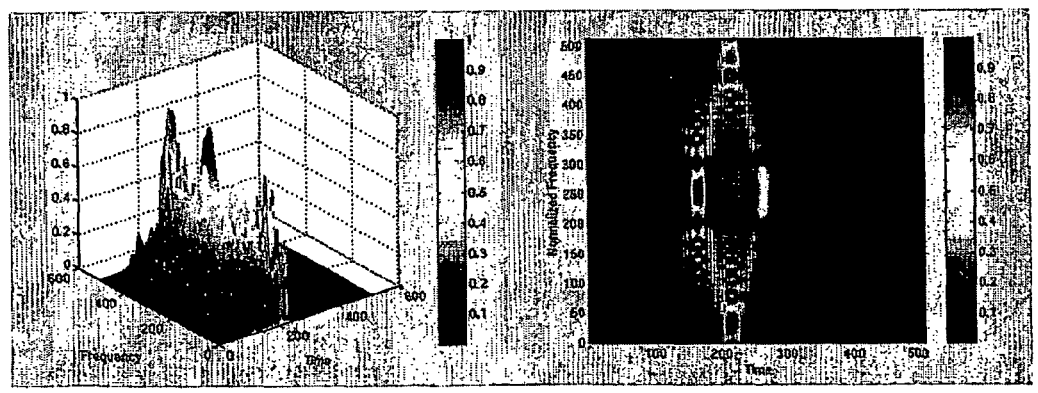
FIG. 23 is a graph illustrating a mesh and a map of the signal of FIG. 19, obtained using the Choi-Williams transformation.

FIG. 23 illustrates a mesh (left) and a map (right) of the signal of FIG. 19, obtained using the Choi-Williams transformation.

Figure 24:
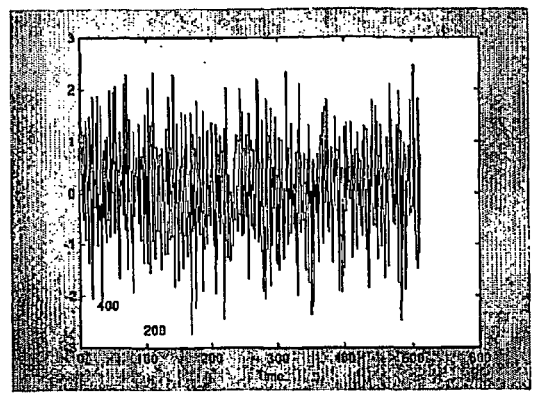
FIG. 24 is a graph illustrating the TFD of a non-stationary signal blended in a Gaussian white noise.

FIGS. 25 to 28 illustrate the TFD of a stationary signal blended in a Gaussian white noise (see FIG. 24).

Figure 25:
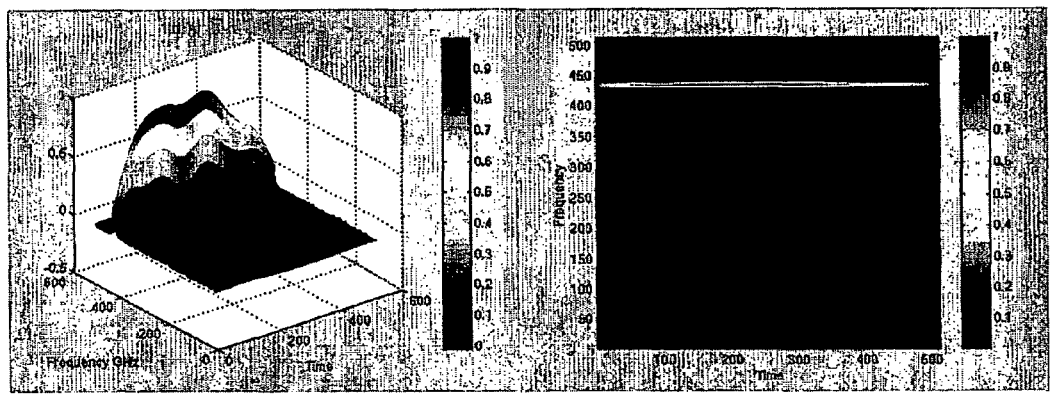
FIG. 25 is a graph illustrating a mesh and a map of the signal of FIG. 24, obtained using a method for determining the energy of a signal according to an embodiment of the present invention.

FIG. 25 illustrates a mesh (left) and a map (right) of the signal of FIG. 24, obtained using a method for determining the energy of a signal according to the present invention.

Figure 26:
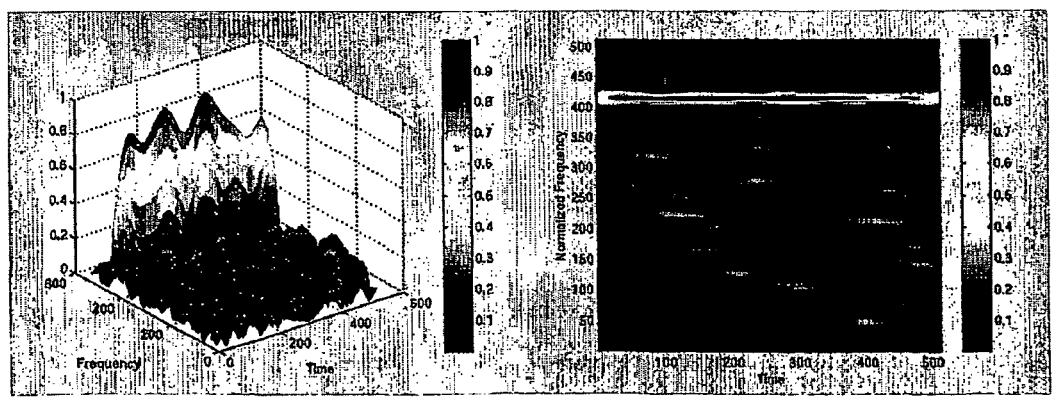
FIG. 26 is a graph illustrating a mesh and a map of the signal of FIG. 24, obtained using the spectrogram with the spectral window of Blackman-Harris.

FIG. 26 illustrates a mesh (left) and a map (right) of the signal of FIG. 24, obtained using the spectrogram with the spectral window of Blackman-Harris.

Figure 27:
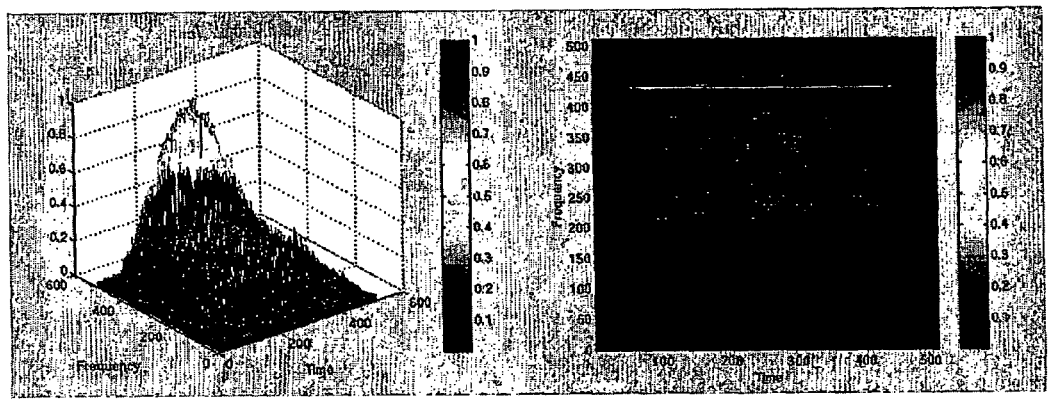
FIG. 27 is a graph illustrating a mesh and a map of the signal of FIG. 25, obtained using the Wigner-Ville transformation.

FIG. 27 illustrates a mesh (left) and a map (right) of the signal of FIG. 24, obtained using the Wigner-Ville transformation.

Figure 28:
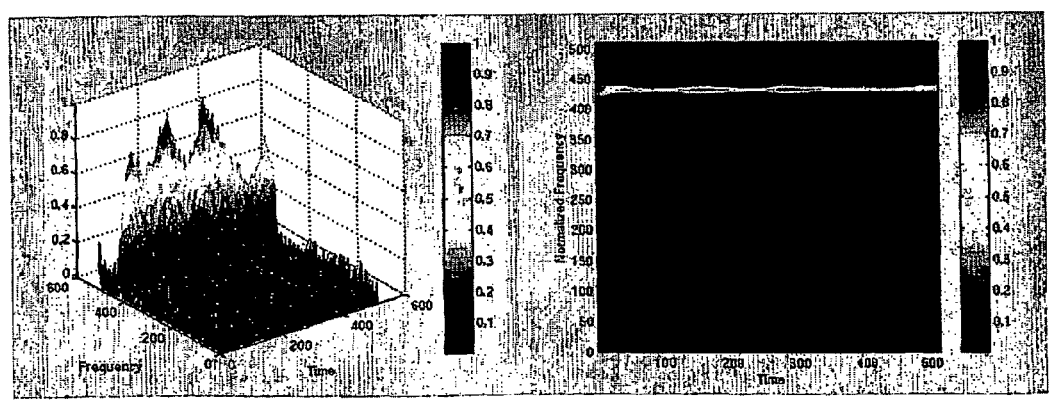
FIG. 28 is a graph illustrating a mesh and a map of the signal of FIG. 25, obtained using the Choi-Williams transformation.

FIG. 28 illustrates a mesh (left) and a map (right) of the signal of FIG. 24, obtained using the Choi-Williams transformation.

The spectrogram using the Blackman-Harris window, and the Choi-Williams and Wigner-Ville distributions are believed to be well known in the art and thus will only be briefly reminded herein. Using the unified presentation of the Cohen class (see relation equation (1)), the difference between the three methods consists of the choice of the kernel $\phi(\eta,\tau)$. For the spectrogram, the following kernel is used:

$$\phi(\eta, \tau) = \int_{-\infty}^{+\infty} h\left(t + \frac{\tau}{2}\right) h*\left(t + \frac{\tau}{2}\right) e^{-j2\pi\eta t} \, dt$$

The spectrogram may also be implemented by the square modulus of the Fast Fourier Transform of the signal windowed by the discrete form of the h(t), i.e. h(k). The Backman-Harris spectrogram uses the Backman-Harris window which coefficients are given as follows:

$$h(k) = a_0 - a_1 \cos\left(2\pi\frac{k-1}{N-1}\right) + a_2 \cos\left(4\pi\frac{k-1}{N-1}\right) - a_3 \cos\left(6\pi\frac{k-1}{N-1}\right),$$

$$k = 0, \ldots, N-1$$

with
$a_0 = 0.35875$
$a_1 = 0.48829$
$a_2 = 0.14128$
$a_3 = 0.01168$

For the Wigner Ville Distribution the kernel in relation (1) is given by $\phi(\eta,\tau)=1$. For the Choi-Williams Distribution, the kernel in relation (1) is given by $$\phi(\eta, \tau) = \exp\left(-\frac{\eta^2 \tau^2}{\sigma}\right).$$

It is to be noted that the energy representation provided by a method according to the present invention does not satisfy the marginal property just like the spectrogram. It is advantageously consistent with the energy conservation ($\phi(0,0)=1$) and verifies both the reality and the time and frequency shift properties.

FIGS. 29 to 36 illustrate two examples of signal analysis performed with the method 100 embodied as software on a personal computer.

Figure 29:
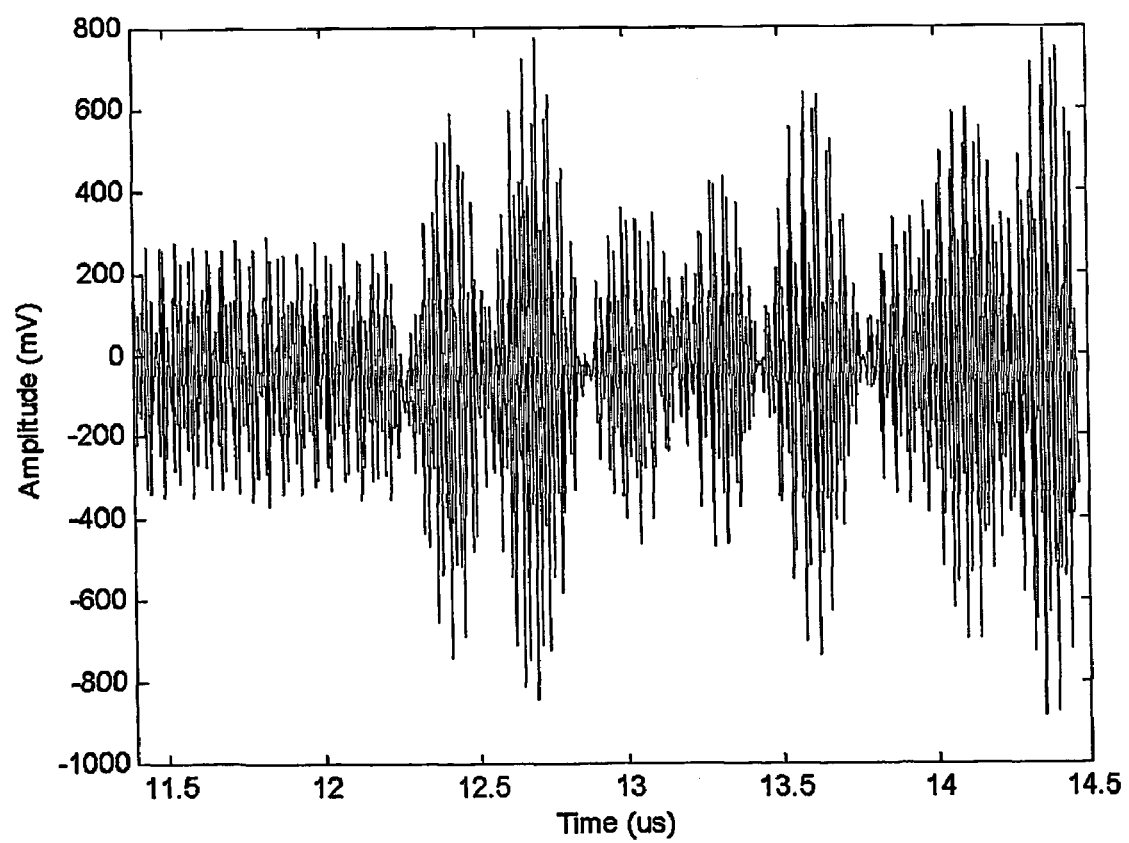
FIG. 29 is a graph illustrating a non-noisy signal sampled at 500 MHz between a 11.5 and 14,5 μs window.
Figure 30:
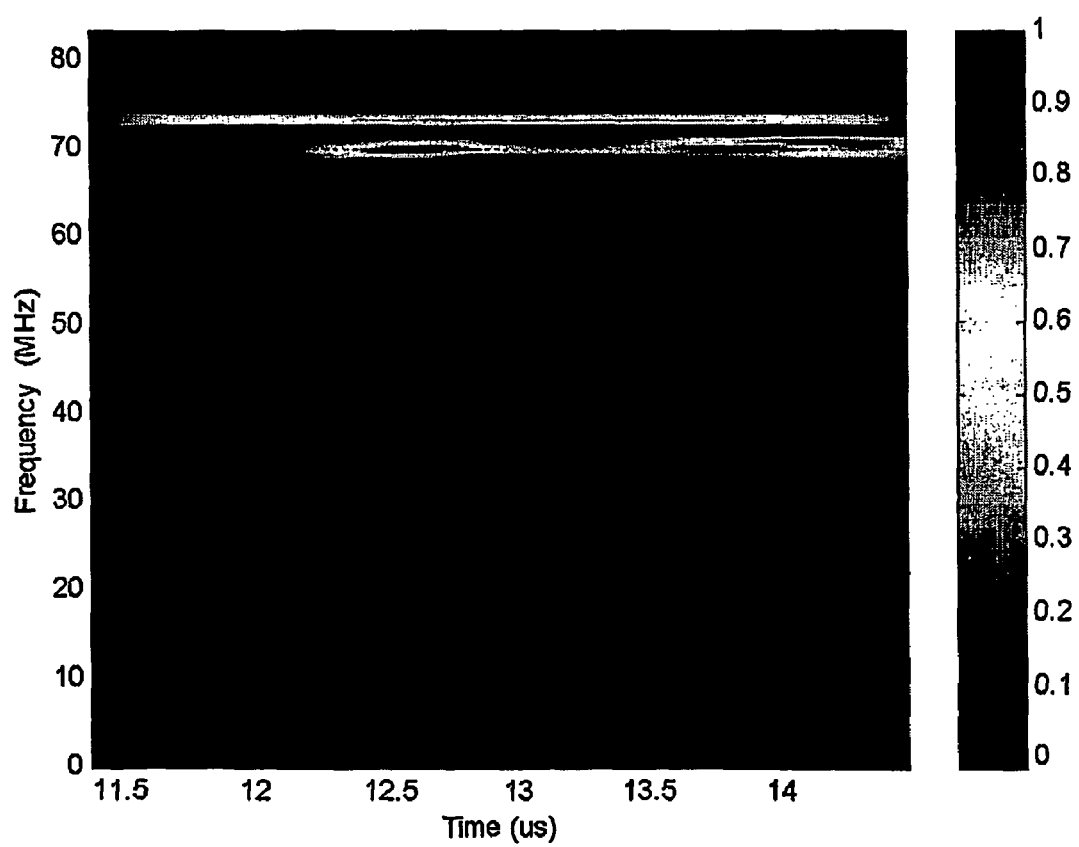
FIG. 30 is a mapped plot of the TFD resulting from an analysis of the signal of FIG. 29 performed with the method of FIG. 4.
Figure 31:
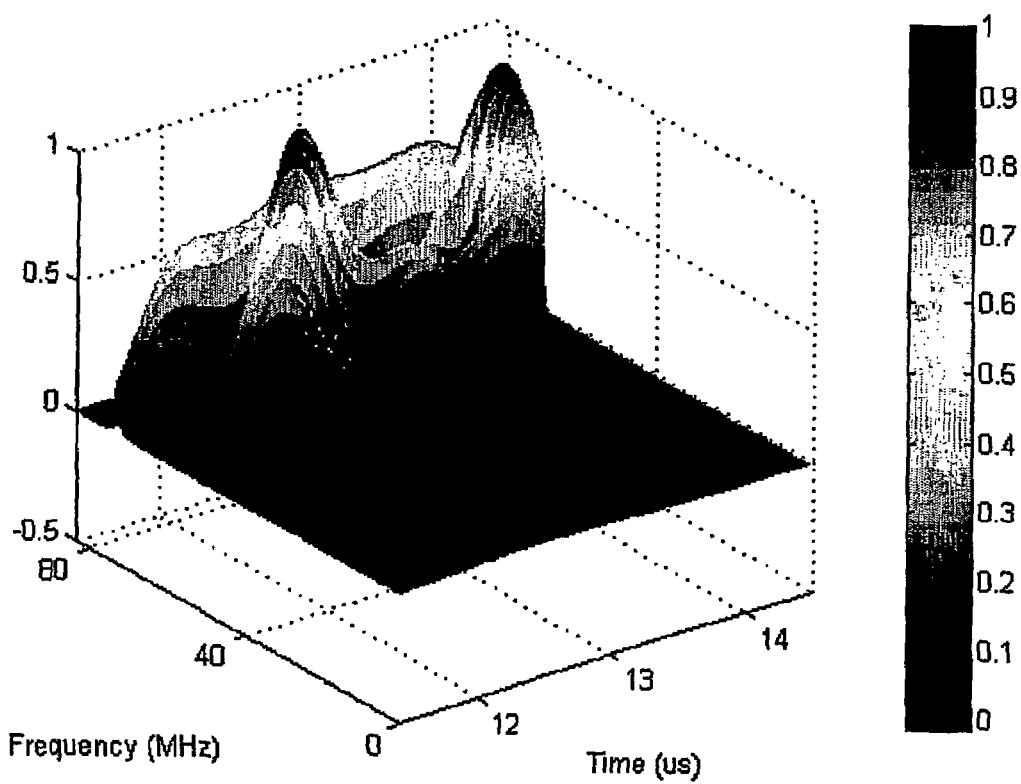
FIG. 31 is a meshed plot of the TFD resulting from an analysis of the signal of FIG. 29 performed with the method of FIG. 4.

FIGS. 30 and 31 are respectively mapped and meshed plots of the time-frequency distribution resulting from an analysis of the signal of FIG. 29 according to the method 100.

FIG. 29 is a time representation between 11.5 and 14.5 μs of a non-noisy signal sampled with a 500 MHz frequency and a factor 3 subsampling.

FIG. 30 shows that the method 100 allows to find the wanted signal around 70 MHz as its sign-on. Interference at around 73 MHz can also be seen from FIG. 30. We can also see that the method 100 yields a good time-frequency resolution and prevents cross-terms.

Both the wanted signal and the interference are clearly distinguished on FIG. 31 with a good resolution.

Figure 32:
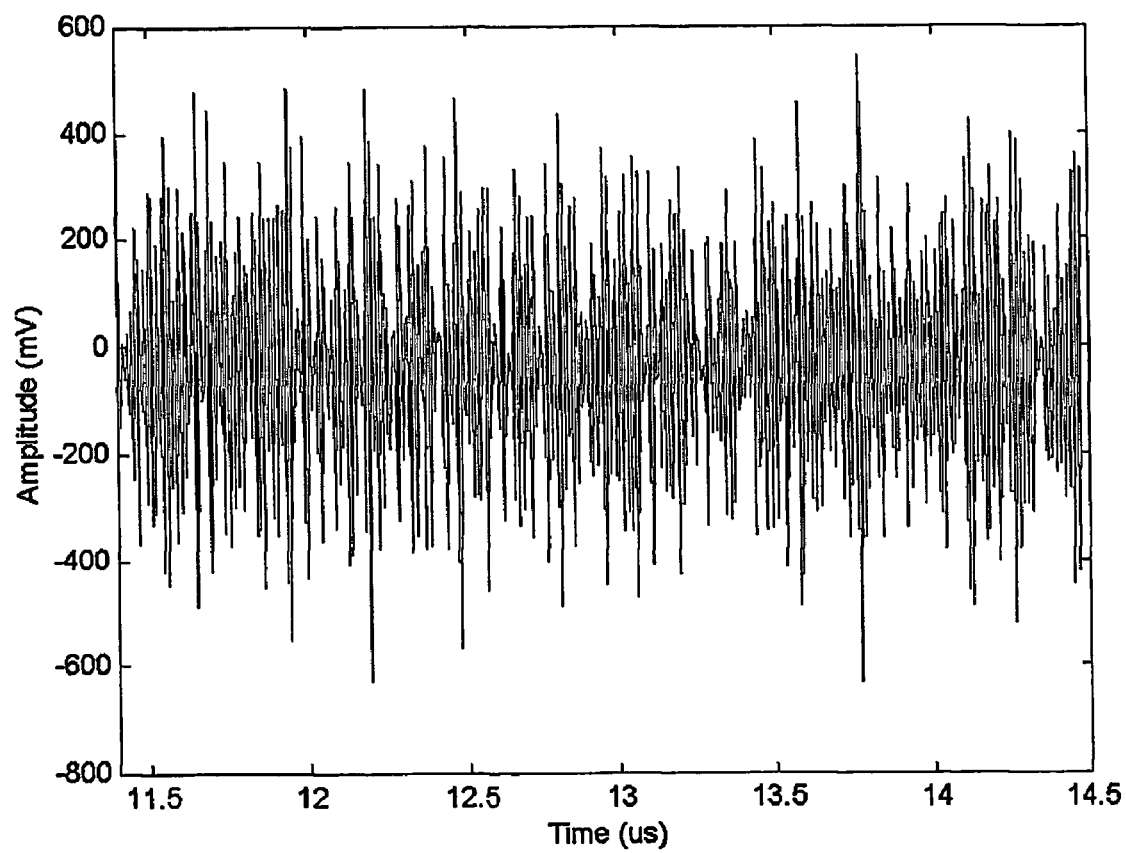
FIG. 32 is a graph illustrating a noisy signal sampled at 500 MHz between a 11.5 and 14,5 μs window.
Figure 33:
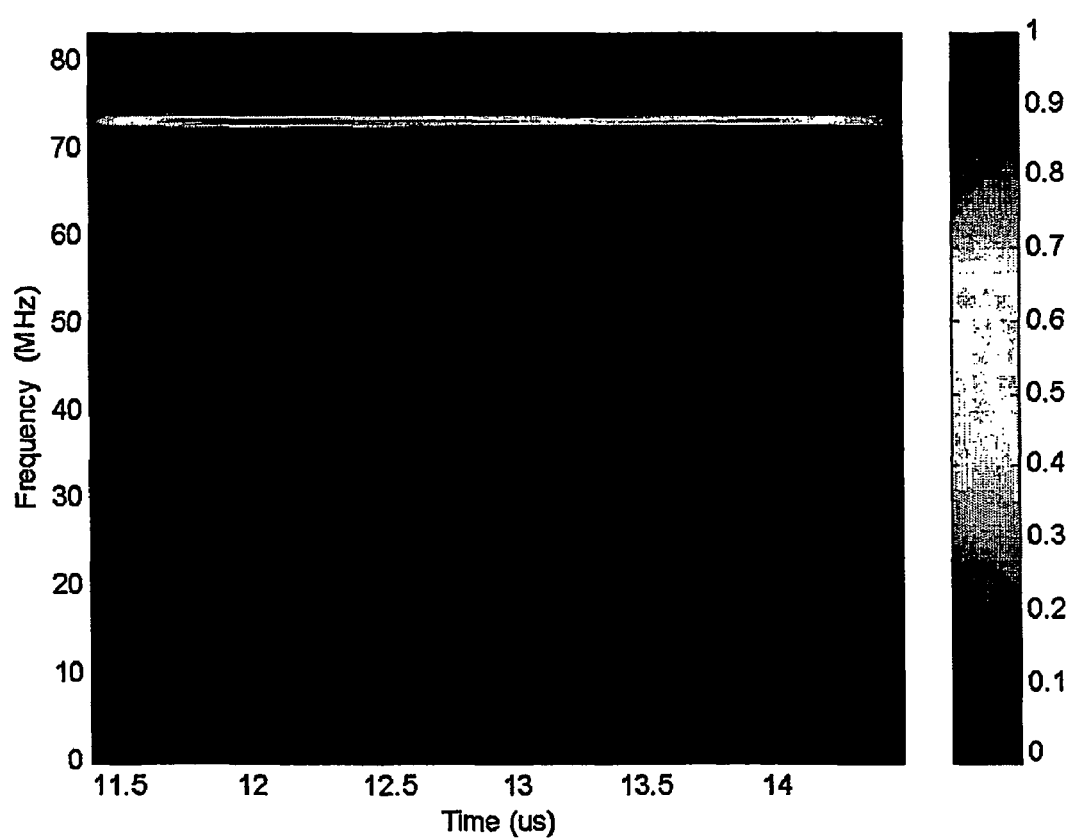
FIG. 33 is a mapped plot of the TFD resulting from an analysis of the signal of FIG. 32 performed with the method of FIG. 4.
Figure 34:
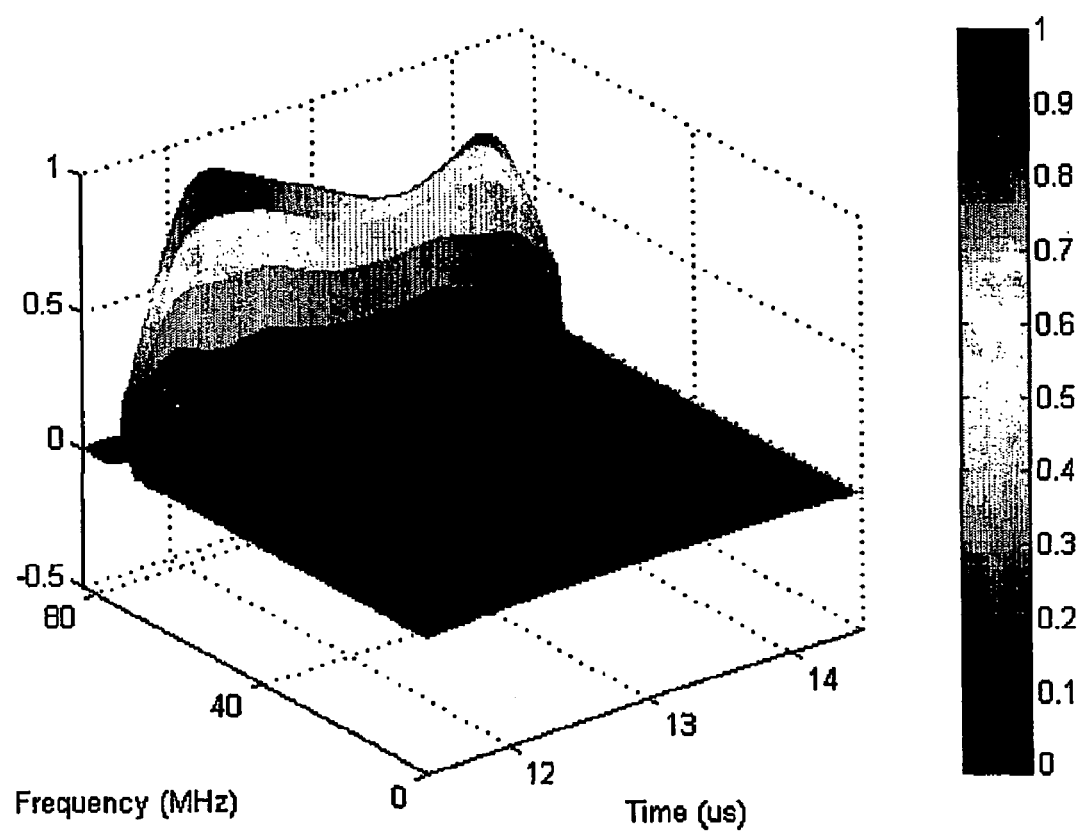
FIG. 34 is a meshed plot of the TFD resulting from an analysis of the signal of FIG. 32 performed with the method of FIG. 4.
Figure 35:
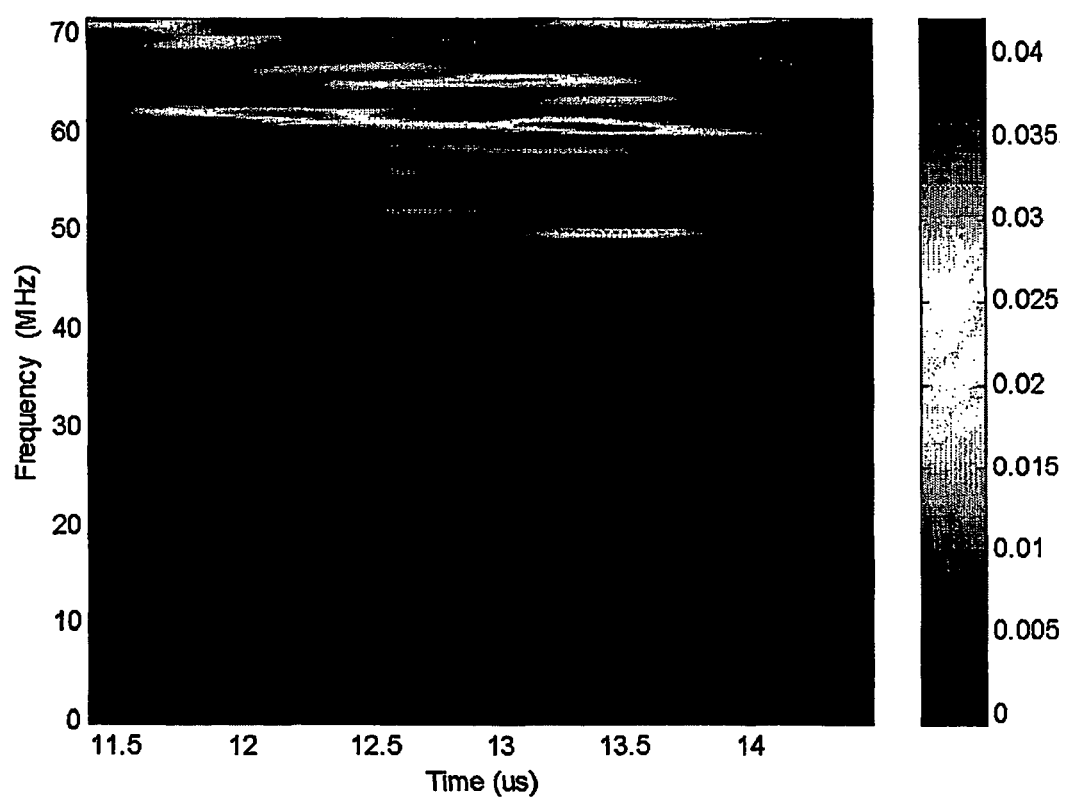
FIG. 35 is the mapped plot of FIG. 33 zoomed on the frequency band from 0 to 72 MHz.

FIGS. 33 and 34 are respectively mapped and meshed plots of the time frequency distribution resulting from an analysis of the signal of FIG. 32 according to the method 100.

FIG. 32 is a time representation between 11.5 and 14.5 μs of a noisy signal sampled with a 500 MHz frequency and a factor 3 subsampling.

FIG. 33 shows that the method 100 allows to find the interference at around 73 MHz. However, since the signal-interference ration is small, the wanted signal can not be clearly distinguished from the noise on FIG. 33 or 34.

Figure 36:
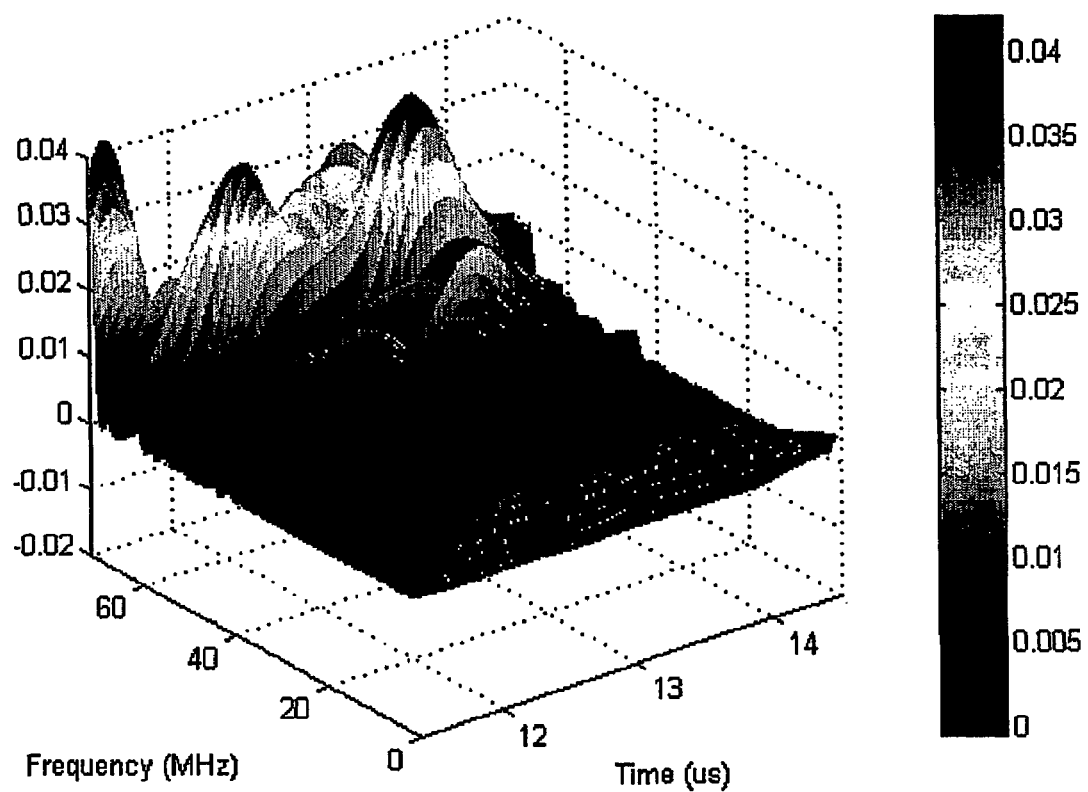
FIG. 36 is the meshed plot of FIG. 34 zoomed on the frequency band from 0 to 72 MHz.

However, when a zoom is performed on the frequency band from 0 to 72 MHz (see FIGS. 35 and 36), the wanted signal and the interference are clearly distinguished. FIG. 36 also allows seeing a d.c. component at 0 MHZ.

Although the present invention has been described hereinabove by way of preferred embodiments thereof, it can be modified without departing from the spirit and nature of the subject invention, as defined in the appended claims.

What is claimed is:

1. A system for measuring the energy of a signal, comprising:
   an acquisition unit for providing samples of the signal;
   a Hilbert transformer for producing analytical signals from said samples of the signal;
   a local correlator for computing the convolutions of a CB kernel and instantaneous autocorrelation functions in a window of analysis of length M so as to yield generalized instantaneous autocorrelation functions; said CB kernel being defined by $$K(n,m) = \begin{cases} \exp\left(C\left(\frac{1}{(n^2+m^2)\left(\frac{B}{M}\right)^2 - 1} + 1\right)\right) & \text{if } (n^2+m^2)\left(\frac{B}{M}\right)^2 < 1 \\ 0 & \text{Otherwise} \end{cases}$$

where B and C are predetermined parameters; and
   a Fourier transformer for determining a time-frequency distribution of the energy of the signal from said generalized instantaneous autocorrelation functions.

2. A system as recited in claim 1, further comprising a parameter controller coupled to said local correlator for adjusting at least one of said parameters B and C.

3. A system as recited in claim 2, wherein said parameter controller includes a user interface.

4. A system as recited in claim 1, further comprising an output unit coupled to said Fourier transformer, and an output device, connected to said output unit.

5. A system as recited in claim 4, wherein said output unit is a visualization unit, and said output device is a display monitor.

6. A system as recited in claim 1, wherein said acquisition unit includes an analog front end for receiving the signal, and an analog/digital converter to convert the signal into said samples of the signal.

7. A system as recited in claim 1, further comprising a storing means.

8. A system as recited in claim 1, wherein said system is an electroencephalogram time frequency analyser; and said signal acquisition unit is configured to receive signals having a frequency ranging from 0 to about 40 Hz.

9. A system as recited in claim 1, wherein said system is a speech time frequency analyser; and said signal acquisition unit is configured to receive signals having a frequency ranging from 0 to about 8 KHz.

10. A system as recited in claim 1, wherein said system is a radio frequency analyser; and said signal acquisition unit being configured to receive signals having a frequency ranging from 300 MHz to about 1 GHz.

11. A method for measuring the energy of a signal, comprising:
    providing a number N of samples n of the signal;
    processing each of said N samples of the signal through a Hillbert transform so as to yield N corresponding analytical signals;
    for values of n ranging from 1 to N,
        providing a window of analysis of length M;
    for values of m ranging from 1 to M,
        computing an instantaneous autocorrelation function corresponding to each of said values of m; and
        computing the convolution of a CB kernel and said corresponding instantaneous autocorrelation function, yielding a generalized instantaneous autocorrelation function for each combination of said values of m and n; said CB kernel being defined by $$K(n,m) = \begin{cases} \exp\left(C\left(\frac{1}{(n^2+m^2)\left(\frac{B}{M}\right)^2 - 1} + 1\right)\right) & \text{if } (n^2+m^2)\left(\frac{B}{M}\right)^2 < 1 \\ 0 & \text{Otherwise} \end{cases}$$

where B and C are predetermined parameters; and
    applying a Fast Fourier Transform to said generalized instantaneous autocorrelation functions, yielding a time-frequency distribution of the energy of the signal for each of said N samples.

12. A method as recited in claim 11, wherein said computing of an instantaneous autocorrelation function includes producing a plurality of autocorrelated signals corresponding to said N samples; said plurality of autocorrelated signals being delayed and multiplicatively combined with said N samples complex conjugates and weighted in accordance with said CB kernel.

13. A method as recited in claim 11, wherein said window of analysis is divided into a first and a second half; said steps of computing an instantaneous autocorrelation function and of computing of the convolution of a CB-kernel and said instantaneous autocorrelation function being performed for values of m in said first half of said window of analysis; said generalized instantaneous autocorrelation function being obtained for each combination of values of m and n in the second half of said window of analysis by symmetry with generalized instantaneous autocorrelation functions obtained for each value of m in said first half.

14. A method as recited in claim 11, further comprising: displaying said time-frequency distribution about the energy of the signal for at least one of said N samples.

15. A system for measuring the energy of a signal, comprising:

means for providing samples of the signal;

means for producing analytical signals from said samples of the signal;

means for computing the convolution of an instantaneous autocorrelation function, derived from said analytical signals, and a CB kernel derived from a Gaussian kernel and having compact support properties; and means for determining a time-frequency distribution of the energy of the signal from said instantaneous autocorrelation function.

* * * * *

UNITED STATES PATENT AND TRADEMARK OFFICE
CERTIFICATE OF CORRECTION

PATENT NO. : 7,035,744 B2
APPLICATION NO. : 10/476727
DATED : April 25, 2006
INVENTOR(S) : Mohamed Cheriet and Adel Belouchrani It is certified that error appears in the above-identified patent and that said Letters Patent is hereby corrected as shown below:

On patent cover sheet, first name of inventor (75), "Adei" should be --Adel--.

In Col. 2, line 34, "Hillibert" should be --Hillbert--.

Signed and Sealed this

Nineteenth Day of December, 2006

JON W. DUDAS
*Director of the United States Patent and Trademark Office*